W. C. GIFFORD.
Improvement in Stanchions.
No. 115,304.  Patented May 30, 1871.
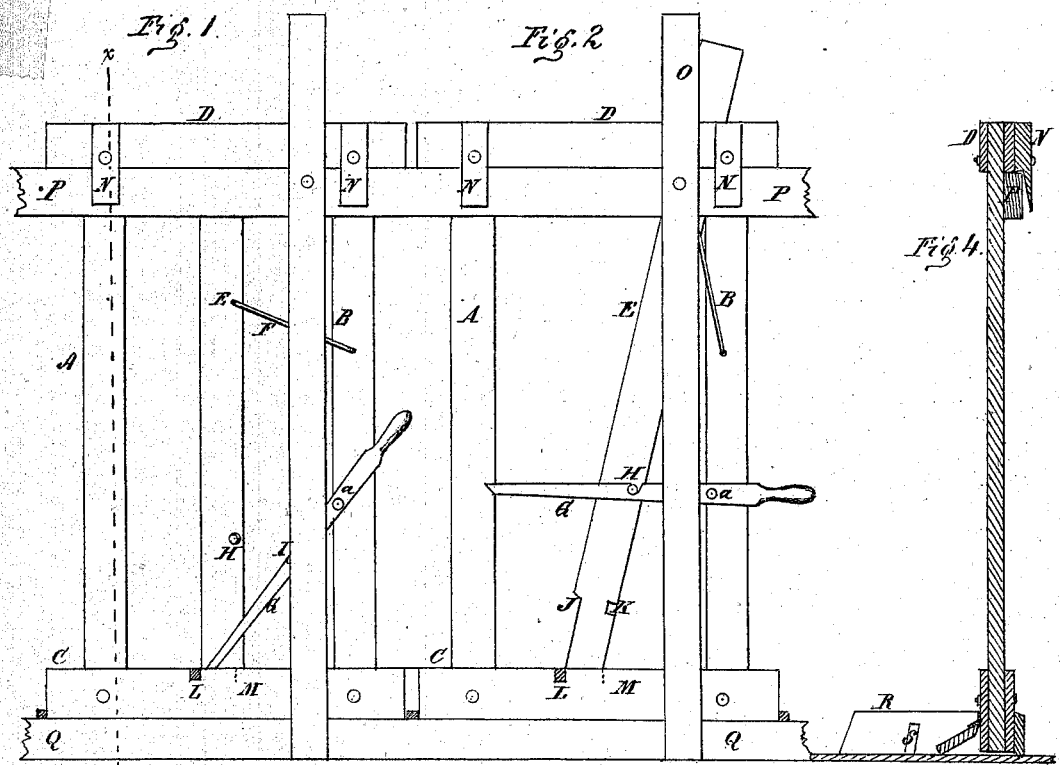
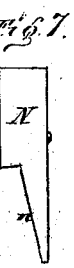
Witnesses:  Inventor:
W. C. Gifford.
Per ____ Attorneys.

115,304

UNITED STATES PATENT OFFICE.

WALTER C. GIFFORD, OF JAMESTOWN, NEW YORK.

IMPROVEMENT IN STANCHIONS.

Specification forming part of Letters Patent No. 115,304, dated May 30, 1871.

*To all whom it may concern:*

Be it known that I, WALTER C. GIFFORD, of Jamestown, in the county of Chatauqua and State of New York, have invented a new and useful Improvement in Swinging Stanchions; and I do hereby declare that the following is a full, clear, and exact description thereof, which will enable others skilled in the art to make and use the same, reference being had to the accompanying drawing forming part of this specification.

My invention consists in a new way of applying stanchions detachably to the stables of cattle, for the purpose of enabling them to be easily removed for repair, or in case of fire, or for the purpose of enabling more or less of them to be changed into door-ways, or to utilize the space in the barn or stable for other purposes.

In the accompanying drawing, Figures 1 and 2 are front elevations of the arrangement. Fig. 3 is also a front elevation, showing the interior arrangement of the stanchions. Fig. 4 is a vertical section of Fig. 1 on the line $x\ x$. Fig. 5 is a metallic arm. Fig. 6 is a front view of the lever or spindle. Fig. 7 is a side view of a hook-button.

I will now describe a stanchion and frame which I employ, and to which I preferably attach my improvement, but do not mean to claim said frame or stanchion; nor do I design to confine myself to those of any particular construction.

A and B are upright stanchion-bars, fastened together by double transverse bars at their lower ends, as seen at C, and at their upper ends, as seen at D. An upright frame is thus made, which may be either fixed in position or be made to swing back and forth, as may be desired. In this example of my invention the frame is suspended from the horizontal timber P by means of one of the transverse bars D, and held in position upon said timber by the hook-button N, as seen in Fig. 4. E is a movable stanchion-bar, attached to the fixed bar B by means of the metal arm F, which turns at right angles and passes through the bars B and E, said arm being secured in place by keys on the opposite side. G is a lever or spindle, pivoted to the upright B at the point $a$. H is a pin projecting from the side of the movable bar E. I is a notch in the lever G. J is an inclined rebatement; and K, a notch opposite the incline in the movable bar E. L is a square piece of timber, fitted crosswise into the upper edges of the transverse bars C and acting as a guide for the bar E. The piece L has the upper corner cut away, between the transverse bars C, to fit the incline J. M is a piece of wood fastened between the transverse bars C, as seen in Fig. 3, acting as a guide to the bar E, and also as a catch to secure the same in place, when closed, by engaging in the notch K. N is a hook-button, shown in Figs 4 and 7, made in such shape as to allow the stanchion to swing forward without binding, also holding it in place by hooking down over the timber P, thereby hanging the stanchion in such a manner that it can be quickly unhung by lifting it a sufficient distance to allow the buttons to pass over the timber P. O O are upright posts, to which is bolted the horizontal timber P. Q is a base-board, against which the stanchion closes when in a perpendicular position. R is a guide extending forward into the manger to prevent a lateral movement of the stanchion, also making a necessary division in the manger for feeding grain. S is a pin in the floor to limit the forward movement of the stanchion. The upright bar A is slotted at T, Fig. 3, so that it can be adjusted laterally to fit the necks of different-sized animals.

As seen in the drawing the stanchion is closed in Fig. 1, as when the neck of the animal is confined between the bars A and E. To open the stanchion for releasing the animal, the handle of the lever G is pressed down, by which the stanchion-bar E, lever G, and arm F are thrown into the position shown in Fig. 2. The notch I engages with the pin H, which supports the stanchion, as shown. To close the stanchion, the animal in reaching down for its food depresses the end of the lever extending across the space, which releases the notch I from the pin H. As soon as released the bar E falls of its own weight, and is closed at the top by the arm F; it also latches at the bottom, by the incline J coming in contact with the guide L, which throws the notch K onto the catch M. The swinging movement of the stanchions serves to ease the animal when rising to his feet or feeding from manger.

The advantages claimed for this arrangement are: It makes a stanchion wherein cattle fasten themselves instantaneously and securely; it gives animals greater ease and freedom of motion; it requires no iron hinges or hooks to hang the stanchion; the space for the animal's neck may be speedily adjusted to any desired size; the stanchions may be quickly unhung and removed from the beam, if necessary, or a single one may be removed without disturbing those remaining; they are simple, cheap, and durable, and may be easily constructed by any one acquainted with the use of tools.

Having thus described all that is necessary to a full understanding of my improvement, what I esteem to be new, and desire to protect by Letters Patent, is—

In combination with the transverse bar D of a swinging stanchion and the transverse bar P of supporting-frame, the button N, cut away at n, as and for the purpose specified.

WALTER C. GIFFORD.

Witnesses:
   CHAS. A. PETTIT,
   THOS. D. D. OURAND.